United States Patent [19]

Hashimoto

[11] Patent Number: 5,046,079
[45] Date of Patent: Sep. 3, 1991

[54] TELEPHONE ANSWERING DEVICE WITH TV TELEPHONE

[75] Inventor: Kazuo Hashimoto, Tokyo, Japan

[73] Assignee: Hashimoto Corporation, Tokyo, Japan

[21] Appl. No.: 421,105

[22] Filed: Oct. 13, 1989

[30] Foreign Application Priority Data

Oct. 14, 1988 [JP] Japan .................. 63-259189

[51] Int. Cl.5 .................. H04M 1/64; H04M 11/00
[52] U.S. Cl. .......................... 379/53; 379/67; 379/82
[58] Field of Search .......... 379/53, 54, 67, 82

[56] References Cited

U.S. PATENT DOCUMENTS

| 4,356,509 | 10/1982 | Skerlos et al. | 358/85 |
| 4,888,795 | 12/1989 | Ando et al. | 379/53 |

FOREIGN PATENT DOCUMENTS

| 1500453 | 9/1981 | Japan . | |
| 62-179288 | 8/1987 | Japan . | |
| 0132261 | 5/1989 | Japan | 379/53 |
| 0137765 | 5/1989 | Japan | 379/53 |
| 2191066A | 12/1987 | United Kingdom . | |

OTHER PUBLICATIONS

"For-Your-Home Video Phones", W. J. Hawkins, *Popular Science*, vol. 232, No. 3, Mar. 1988, pp. 60-62 & 107.

Primary Examiner—Thomas W. Brown
Attorney, Agent, or Firm—Lowe, Price, LeBlanc and Becker

[57] ABSTRACT

A telephone answering device with TV telephone for receiving and displaying a picture signal sent from a calling party through a telephone line, in the intermission of ringing signals, so that a called party can confirm who is calling by seeing the picture signal on the TV display. The picture signal as well as an incoming message from the calling party is recorded in a recording medium to be reproduced manually by the called party at home or remotely from a remote location. The TV telephone has a line which is common with or separate from the line of the telephone answering device.

5 Claims, 3 Drawing Sheets

TELEPHONE ANSWERING DEVICE WITH TV TELEPHONE

BACKGROUND OF THE INVENTION

The present invention relates to a telephone answering device having TV telephone functions.

In the conventional TV telephone, both calling and called parties talk to each other while displaying the other party's image picture in the TV display. However, the conventional TV telephone does not have an automatic telephone answering function, so that it has a problem of reducing its practical effect by half.

SUMMARY OF THE INVENTION

It is an object of the present invention to provide a telephone answering device with a TV telephone wherein the picture of a calling party's side can be received in the interruptions of ringing signals of a called party's telephone, and the picture sent from the calling party during the called party's absence can be reproduced manually after the called party returns home or remotely by the called party from a remote location, wherein the TV telephone has a line which is common with or separate from the telephone answering device, and wherein a still or motion picture is to be sent.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENT

The arrangement and operations of the preferred embodiments of the present invention will be described.

Figure 1:
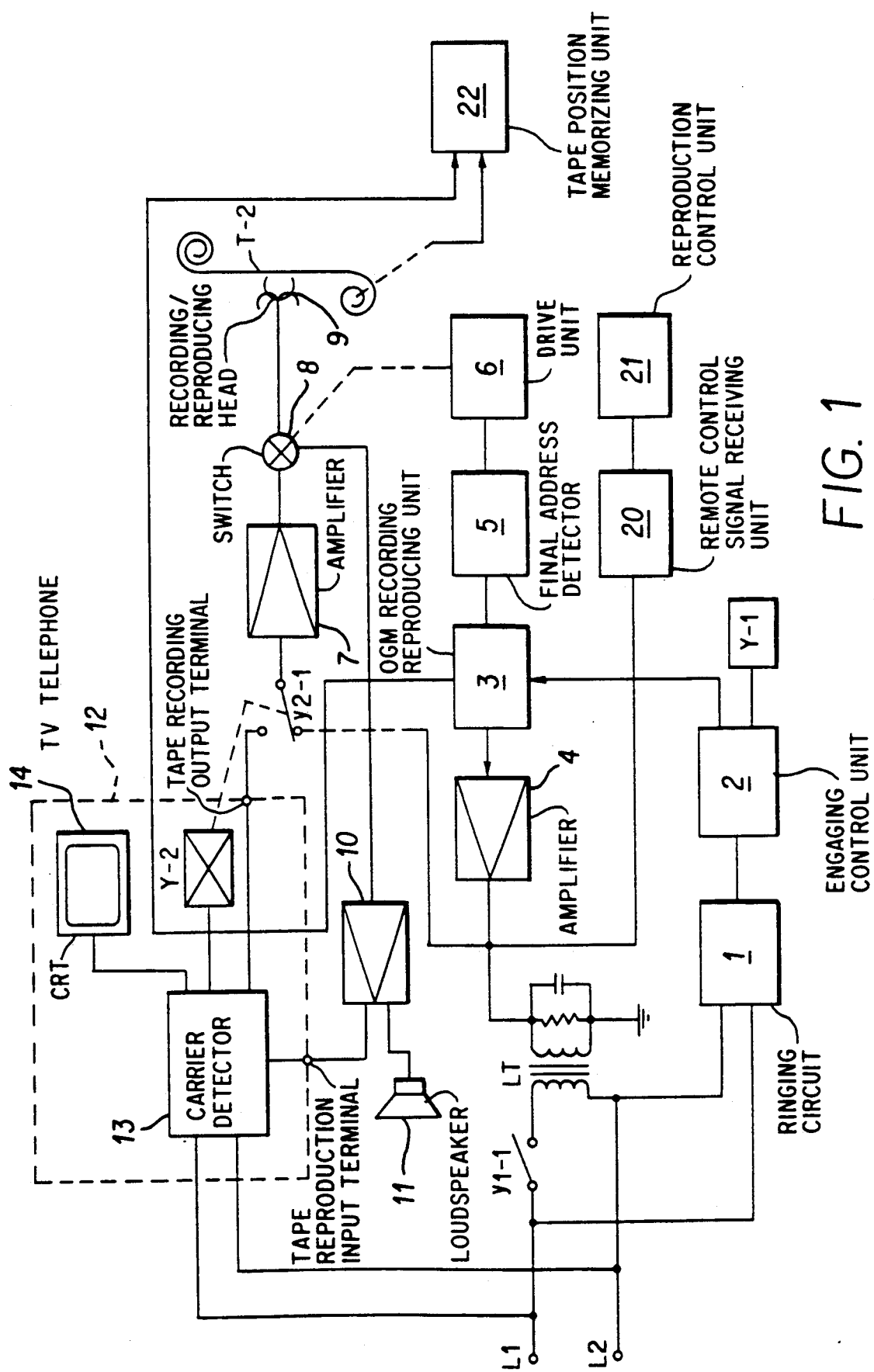
FIG. 1 is a block diagram showing the principle of a first embodiment of the present invention.
Figure 2:
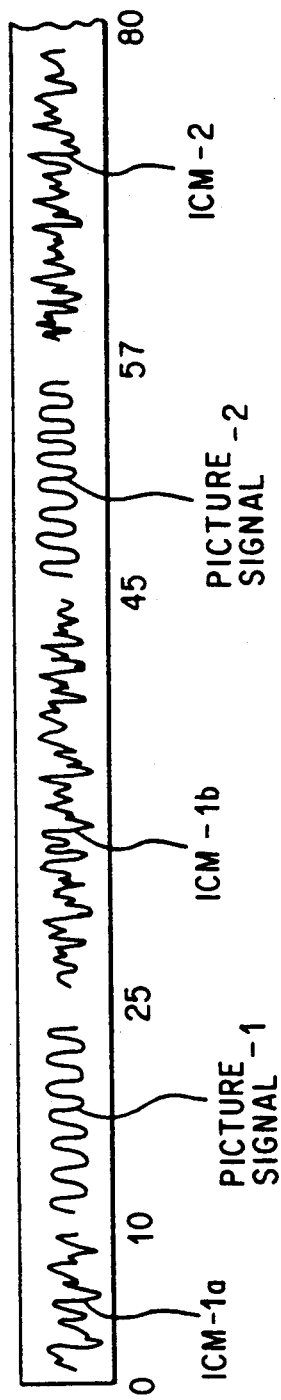
FIG. 2 is a schematic diagram showing the recorded state of an incoming message tape.

In FIG. 1: reference characters L1 and L2 designate telephone lines; letters LT designate a line transformer; and numeral 1 designates a ringing circuit which is composed mainly of a photo-coupler for detecting a calling signal and which is enabled to detect pulses to be generated in the telephone line when a calling party hangs up. Designated at numeral 2 is an engaging control unit which is composed mainly of a flip-flop and energized to retain a load relay Y-1 ON when the ringing circuit 1 detects a calling signal. The relay Y-1 having a contact y1-1 engages the aforementioned telephone line when the contact y1-1 is made. Moreover, numeral 3 designates an OGM recording/reproducing unit using a solid-state memory for recording and reproducing an outgoing message (OGM). Numeral 4 designates an amplifier for sending the OGM to the telephone line. Numeral 5 designates a final address detector for detecting the final address of the memory of the OGM recording/reproducing unit, i.e., the end of the OGM to generate an output for energizing a T-2, i.e., incoming message tape, drive unit 6. Numeral 7 designates an amplifier for amplifying the incoming message and still picture signals of the calling party. Numeral 8 designates a switch for switching the recording and the reproducing operations of the incoming message (ICM) tape T-2, although simply shown. Numeral 9 designates a recording/reproducing head. The ICM tape T-2 is used for recording and reproducing the incoming message and the picture signals of the calling party. Moreover, numeral 10 designates an amplifier for amplifying the aforementioned incoming message and picture signals when the ICM tape T-2 is switched to the reproducing operations. Numerals 11 and 12 designate a loudspeaker and a TV telephone, respectively, which are shown only in connection with their portions relating to the present invention. Numeral 13 designates a carrier detector for detecting the carrier frequency (e.g., 1,748 Hz) of the picture signals sent from the TV telephone (although not shown) of the calling party. If this carrier frequency is detected, only the picture signals are outputted from the shown tape recording output terminal and to retain the relay Y-2 ON while the carrier frequency is being detected. Numeral 14 designates a CRT display which is arranged to display the picture as a still picture when the picture signals come in to the telephone lines L1 and L2 or when the picture reproduced from the ICM tape T-2 is inputted to the shown tape reproduction input terminal.

Next, specific operations will be described in the following. First of all, the OGM recording/reproducing unit using the solid-state memory is recorded by known means with a message, for example, "This is Hashimoto Corporation speaking, and the person in charge is now absent. Please speak your name and message after the beep tone. This telephone answering device receives a TV telephone call, too. You may send your picture 'BEEP'".

Then, any ringing signals that come in are detected by the ringing circuit 1, and the output thereof sets a flip-flop (although not shown) in the engaging control unit 2 to retain the load relay Y-1 ON. At this time, the contact y1-1 of the relay Y-1 is made to engage the telephone lines L1 and L2 through the line transformer LT so that the ringing signals are stopped to establish an off-hook mode. Moreover, the OGM recorded in the OGM recording/reproducing unit is sent out to the calling party through the amplifier 4 and the line transformer LT. Hearing the above-specified content of the OGM, the calling party understands that the telephone answering device receives the TV telephone call, too. If, however, the calling party knows that fact for the first time it takes considerable time to prepare to send his picture from his TV telephone. In this case, therefore, after the OGM has been sent out to switch the ICM tape T-2 to the recording mode through the final address detector 5 and the T-2 drive unit 6, the calling party displays his image (or face) picture in his TV telephone set, while speaking his message, confirms his picture and then pushes the send button Here, the picture signals sent out from the TV telephone of the calling side are detected through the telephone lines L1 and L2 at the carrier detector 13 inside the TV telephone 12 on the side of the telephone answering device and displayed in the CRT 14. Simultaneously, the picture signals are outputted to the tape recording output terminal. Since the relay Y-2 is retained ON while the carrier of the picture signals is being detected, as has been described above, the picture signals are recorded in the ICM tape T-2 through a contact y2-1 switched to the shown opposite side, the amplifier 7, the switch 8 and the recording/reproducing head 9. While the picture signals are being sent out for these several seconds, the calling party cannot send his message, which is continuously recorded in the ICM tape T-2 without any superposition with the picture signal, after the picture has been sent out through the telephone lines L1 and L2, the line transformer LT, the contact y2-1 in the shown position, the amplifier 7, the switch 8 and the recording/reproducing head 9.

When the calling party ends his message and hooks his handset (not shown) on, the voltage change on the telephone lines L1 and L2 is detected by the ringing circuit 1, and the output thereof resets the flip-flop (not shown) in the engaging control unit 2 to turn off the engaging relay Y-1 thereby to return the telephone answering device to the standby mode. Incidentally, the actual TV telephone set either sends out a two-frequency signal for switching the voice reception to the picture reception or adjusts the level of the picture signals before it sends out the carrier signal. However, this detail will be omitted because it has no direct relation to the present invention. In case, on the other hand, the calling party sends his picture signals during sending of the aforementioned OGM, the sending of the OGM outputted from the OGM recording/reproducing unit 3 may be released when the aforementioned carrier signal or the aforementioned two-frequency signal (although its detecting circuit is not shown) is detected.

Next, in order to reproduce the incoming message/picture signals thus recorded, the position of switch 8 is changed to the reproduction side to rewind the ICM tape, T-2. If reproduction is then started, the reproduced output is amplified by the loudspeaker 11 through the recording/reproducing head 9, the switch 8 and the reproduction amplifier 10. Simultaneously, the picture signals are reproduced and detected by the carrier detector 13 so that they are displayed as a still picture in the CRT 14. Each time picture signals of several seconds are reproduced, the still picture is updated.

Figure 4:
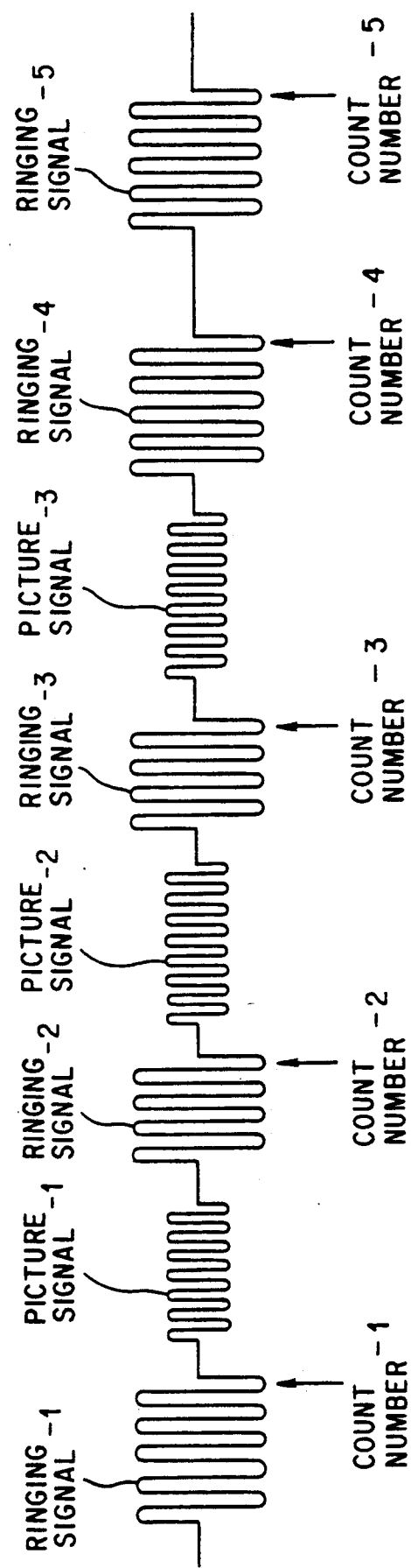
FIG. 4 is a schematic diagram showing the picture signals sent in the intermission of ringing signals.
Figure 3:
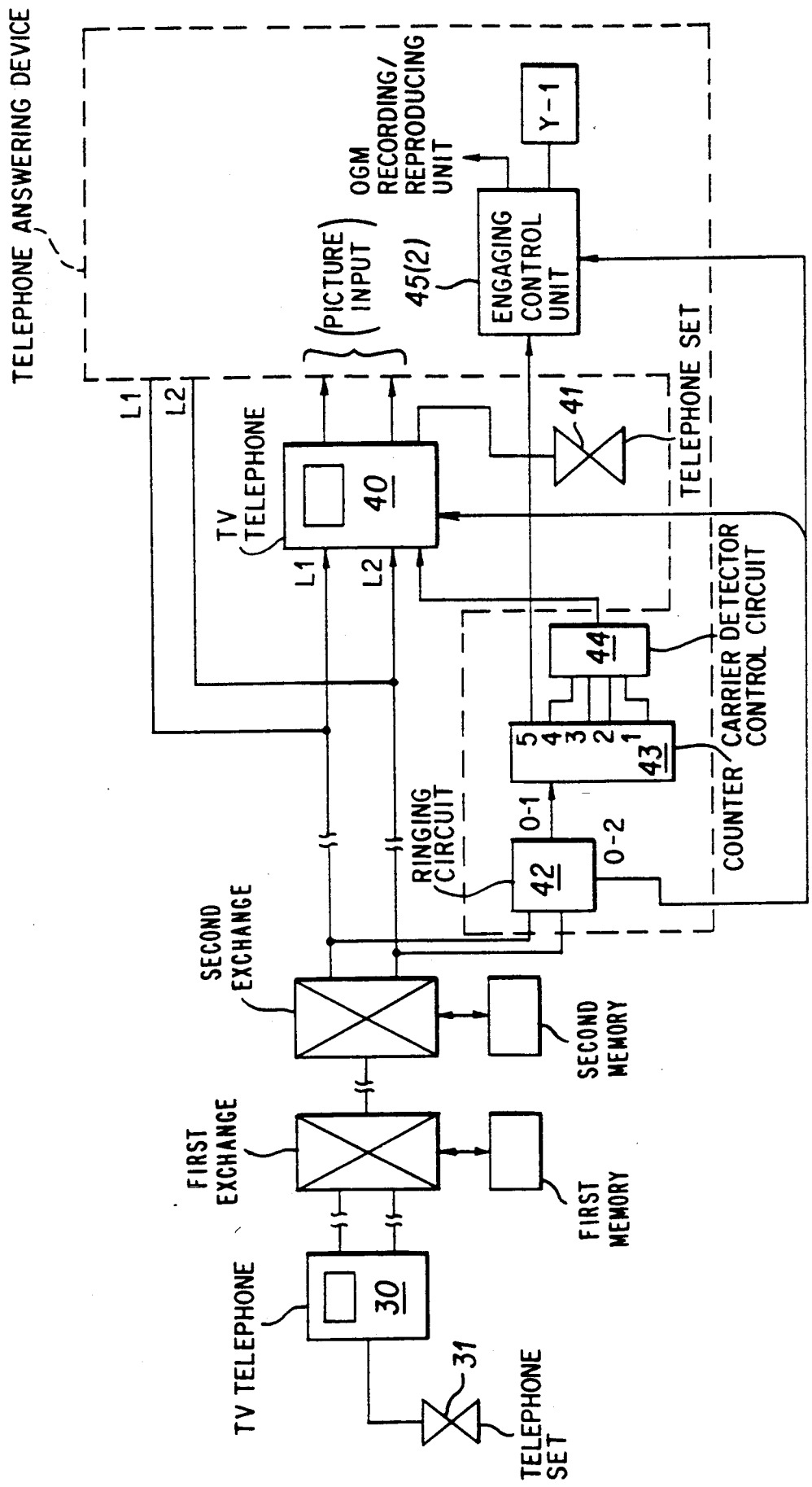
FIG. 3 is a block diagram showing the principle of a second embodiment of the present invention.

With reference to FIGS. 3 and 4, a second embodiment will be specifically described in the following in connection with its structure and operations. This second embodiment also contemplates to clarify who is calling by sending the still picture between the ringing signals in case the TV lines and the communication lines are common.

The structure will be described with reference to FIG. 3. Reference numeral 30 designates a TV telephone set at the calling side. A telephone set is added to the TV telephone set. A first exchange belongs to the calling side, whereas a second exchange belongs to the called side. These exchanges are equipped with first and second memories and, respectively, for temporarily storing the still pictures sent from the TV telephone set 30. The sending of one still picture through the existing TV telephone takes about 6 seconds and cannot be effected for one interruption period of 2 seconds between domestic ringing signals. Therefore, the still picture is temporarily stored in the memories and is divided and transmitted several times in synchronism with the ringing signals. However, the still picture can be sent at one time in an area or country where the interval of the ringing signals is long.

Reference numeral 40 designates a TV telephone set belonging to the called party; numeral 41 designates a telephone set; numeral 42 designates a ringing circuit for detecting the ringing signals; and numeral 43 designates a counter for counting the ringing signal. This counter 43 has output terminals 1 to 5 for the counted values 1 to 5. Numeral 44 designates a carrier detector control circuit for controlling the carrier detector (designated at 13 in FIG. 1) built in the TV telephone set 40 so that picture signals (of a still picture) can be received without being obstructed by the ringing signals during interruptions of the ringing signals, as indicated in FIG. 4. Numeral 45 designates an engaging unit (corresponding to 2 of FIG. 1). The overlapped portions of the telephone answering device in FIG. 1 are omitted.

Next, the specific operations will be described in the following. The calling party displays his picture in the TV telephone set 30 by predetermined operations and then dials the telephone set 31 to call up the called party. If the dialing operation is ended, the picture sending button (although not shown) of the TV telephone set 30 is depressed. Then, the picture signals of the calling party are once stored in the first memory of the first exchange. At this time, the ringing back tone is sent from the exchange $-1$ to the calling side (i.e., the TV telephone set 30). As will be described hereinafter, however, the picture signals can be sent out either at one time in the interruption of the ringing back tone or in a time sharing manner. Since, moreover, the picture signals and the ringing back tone have different frequencies, the former can be sent out ignoring the latter. Alternatively, the picture signals can be sent directly to the second memory and not through the first memory.

In either event, the picture signals are stored in the second memory of the exchange.

At the side of the called party (i.e., the TV telephone set 40), on the other hand, the ringing signals sent from the exchange $-2$ are detected by the ringing amplifier 42 so that the detected output is applied to the counter 43. This counter 43 takes a counted number 1 when the first ringing signal $-1$ ends, as shown in FIG. 4, to take an H level at its output terminal 1. In response to this output, the carrier detector (corresponding to 13 of FIG. 1) of the TV telephone set 40 is activated through the carrier detector control circuit 44 for 2 seconds from the trailing edge of the ringing signal $-1$ shown in FIG. 4. For this 2 seconds, the picture signal $-1$ forming part of the picture signals is received. Likewise, the picture signals $-2$ and $-3$ are received in the intermission of the ringing signals $-2$ to $-4$ and are sequentially displayed in the TV telephone set 40.

The called party is enabled to confirm who is calling by looking at the picture signals $-1$ to $-3$ which are sequentially sent in the intermission of the ringing signals. If any answer is necessary, the telephone set 41 may be picked up to stop the ringing signals so that the called party may speak.

In case the called party is absent or unable to answer for some reason, on the other hand, the relay Y-1 is retained ON through the engaging control unit 45 (corresponding to 2 of FIG. 1) by the output of the counter 43, when the ringing signals call five times so that the counter 43 takes a counted value of 5. Then, the telephone line is engaged to bring the automatic telephone answering device into its operative state, as has been described with reference to FIG. 1.

Thus, the incoming message of the calling party is recorded in the ICM tape after the outgoing message has been sent out, as has been described hereinbefore. When the calling party subsequently hangs up the telephone, the voltage change of the telephone lines L1 and L2 at that time is detected by the ringing circuit 42. This detected output is sent from the output terminal 0-2 to turn OFF the relay Y-1 through the engaging control unit 45 thereby to release the engaging of the telephone lines. Simultaneously, that output is partially applied to the TV telephone set 40, and the picture signals displayed in the TV telephone set 40 are transferred to the ICM tape by using the means for driving the relay Y-2 described with reference to FIG. 1. As a result, the picture signals (of the still picture) of the calling party are recorded subsequent to his message, and the telephone answering device then returns to its standby mode.

Incidentally, an ISDN line can be connected with eight terminals so that it can be used as eight lines. However, the device of the present invention should not be limited to the foregoing embodiments but can also be applied to the case in which the voice and the picture signals are transmitted through independent lines.

In a conventional manner, the incoming messages recorded in the telephone answering device may be accessed by the user from a remote telephone if he is absent and wishes to review his messages. If the remote telephone has TV telephone capability, the recorded picture signal will be displayed while the voice message is heard.

As has been described hereinbefore, the present device is enabled to add the automatic answering functions to the existing TV telephone thereby to confirm the picture of the other party in the intermission of the ringing signals when a call is received. At this time, common or separate lines can be used. Thus, it can be said that the present invention improves the practical effect of the device of this kind.

Further, in Japanese Patent No. 1,500,453 by the same applicant, there is disclosed a device which uses four lines in total, separately using two lines each for the TV and for the telephone. According to the present invention, however, the above object can be accomplished by two telephone lines. The present invention is therefore more advantageous in practical use.

Although certain preferred embodiments have been shown and described, it should be understood that many changes and modifications may be made therein without departing from the scope of the invention.

I claim:

1. A telephone answering device with TV telephone; comprising:
   ringing signal detection means for detecting ringing signals coming from a calling party through a telephone line in a standby mode of said telephone answering device with said TV telephone;
   engaging means for releasing said telephone answering device from said standby mode and responsive to the output of said ringing signal detection means;
   means for sending out an outgoing message to said calling party after the engaging of the telephone line by said engaging means;
   first recording means for recording an incoming message from the calling party in a recording medium after the sending of said outgoing message;
   carrier signal detection means for detecting the carrier signal of a picture signal sent from the TV telephone of the calling party through the telephone line between ringing signals or after said engaging;
   second recording means for separately recording said picture signal in said recording medium after the detection of the carrier by said carrier signal detection means; and
   restoration means for restoring the standby mode after the recording operations by said first recording means and/or said second recording means.

2. A telephone answering device with TV telephone, comprising;
   ringing signal detection means for detecting ringing signals coming from a calling party through a telephone line in the standby mode of said telephone answering device with TV telephone;
   engaging means for releasing said telephone answering device from said standby mode and responsive to said ringing signal detection means;
   means for sending out an outgoing message to said calling party after the engaging of the telephone line by said engaging means;
   first recording means for recording an incoming message from the calling party in a recording medium after the sending of said outgoing message;
   carrier signal detection means for detecting the carrier signal of a picture signal sent from the TV telephone of the calling party through the telephone line between ringing signals or after engagement thereof;
   second recording means for separately recording said picture signal in said recording medium after the detection of the carrier by said carrier signal detection means;
   restoration means for restoring the standby mode after the recording operations by said first recording means and/or said second recording means; and
   means for reproducing signals recorded in the recording medium in response to a remote operation by a user at a remote location,
   whereby the picture signal recorded in said recording medium is displayed during the remote reproduction in the TV telephone connected to the telephone line of the remote user.

3. In combination with a TV telephone system operable to transmit through a telephone line a picture signal between ringing signals generated in response to dial data of a calling party, a telephone answering device with TV telephone at a location of a called party, comprising:
   means for receiving said picture signal between ringing signals;
   means for displaying in the TV telephone an image corresponding to said picture signal;
   engaging means for engaging said telephone line, and thereby releasing said telephone answering device from a standby mode, after a predetermined number of ringing signals while the display of said image may be confirmed;
   answering means for sending out an outgoing message after the engaging by said engaging means;
   recording means for recording an incoming message from the calling party after answering by said answering means and for separately recording said picture signal; and
   restoration means for restoring said standby mode after the recording of the incoming message of the calling party by said recording means;
   wherein the picture signal corresponding to the image displayed in the TV telephone is transferred to and recorded in the recording medium containing the incoming message from the calling party following the recording of the incoming message.

4. In combination with a TV telephone system operable to transmit through a telephone line a picture signal between ringing signals generated in response to dial data of a calling party, a telephone answering device with TV telephone at a location of a called party, comprising:

means for receiving said picture signal between ringing signals;

means for displaying in the TV telephone an image corresponding to said picture signal;

engaging means for engaging said telephone line, and thereby releasing said telephone answering device from a standby mode, after a predetermined number of ringing signals while the display of said image may be confirmed;

answering means for sending out an outgoing message after the engaging by said engaging means;

recording means for recording an incoming message from the calling party after answering by said answering means and for separately recording said picture signal; and restoration means for restoring said standby mode after the recording of the incoming message of the calling party by said recording means.

5. In combination with a TV telephone system operable to transmit through a telephone line a picture signal between ringing signals generated in response to dial data of a calling party, a telephone answering device and a TV telephone at a location of a called party, comprising:

means for transmitting said picture signal during the time between ringing signals;

means for displaying an image corresponding to said picture signal received between ringing signals;

means for releasing said telephone answering device from a standby mode by engaging said telephone line after a predetermined number of ringing signals and means for separately recording an incoming voice message and said picture signal in a recording medium of said telephone answering device.

* * * * *